B. H. HOWARD AND E. J. TURNER.
INGOT MOLD AND FEEDER.
APPLICATION FILED APR. 18, 1922.

1,431,804.

Patented Oct. 10, 1922.
3 SHEETS—SHEET 1.

Inventors,
B. H. Howard
E. J. Turner
By C. R. Wright, Jr. Attorney

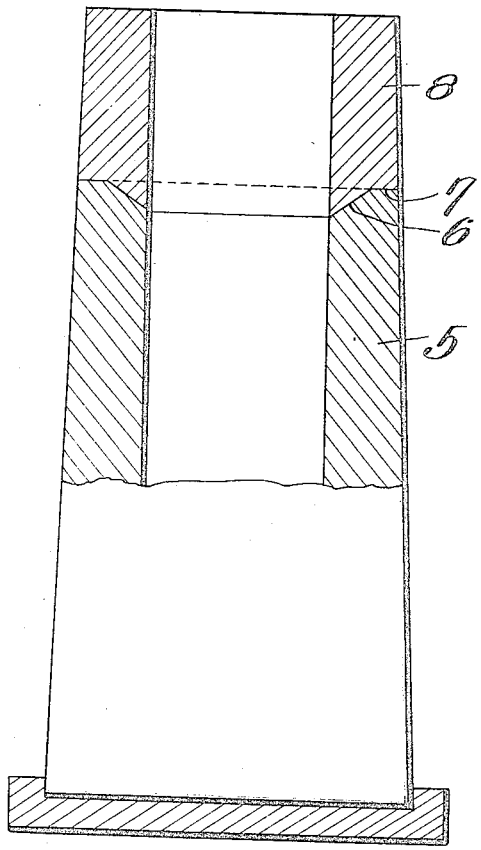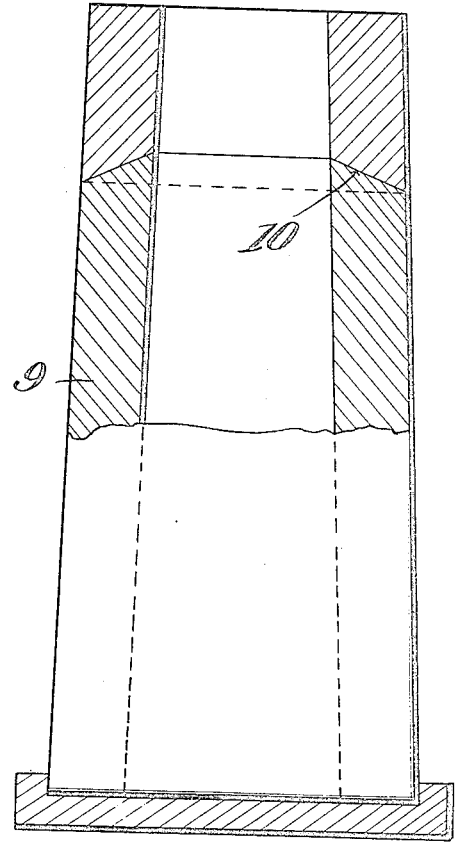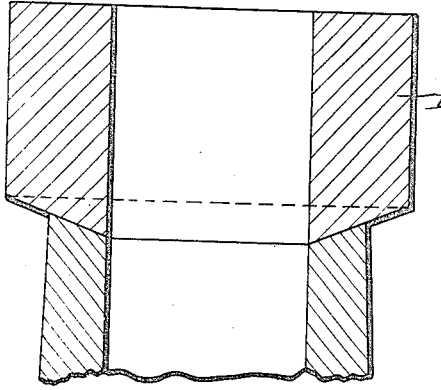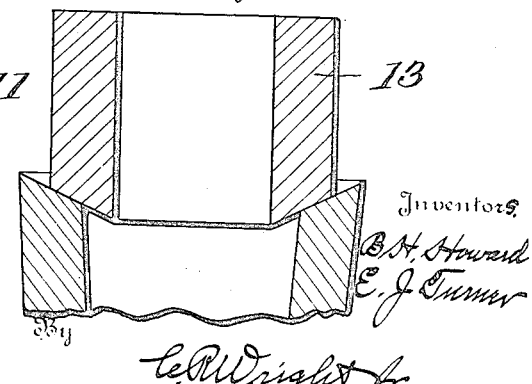

B. H. HOWARD AND E. J. TURNER.
INGOT MOLD AND FEEDER.
APPLICATION FILED APR. 18, 1922.

1,431,804.

Patented Oct. 10, 1922.
3 SHEETS—SHEET 3.

Patented Oct. 10, 1922.

1,431,804

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

INGOT MOLD AND FEEDER.

Application filed April 18, 1922. Serial No. 554,836.

To whom it may concern:

Be it known that BLOOMFIELD H. HOWARD and ERNEST J. TURNER, citizens of the United States, residing, respectively, at city of Washington, District of Columbia, and Pittsburgh, county of Allegheny, State of Pennsylvania, have invented certain new and useful Improvements in Ingot Molds and Feeders, of which the following is a specification.

Our invention relates to improvements in ingot molds and feeders.

The object of our invention is to provide a mold and hot top feeder which will enable the manufacture of iron or steel ingots uniform in contour throughout their length, without the usual shoulder offset at the upper end caused by the hot top fitting into the mold.

Another object of our invention is to provide a mold and hot top so arranged that the hot top feeder can be readily placed and held on the mold and so constructed that the hot top will automatically center itself upon the mold with the inner walls of the hot top and molds flush with each other.

A further object of our invention is to provide a mold and hot top with a considerable degree of flexibility as to relative sizes so that variations in the relative sizes of the mold and hot top feeder will allow the proper centering of the hot top feeder on the mold and at the same time firmly hold the feeder in position to allow of the pouring of the metal in the mold.

A still further object of our invention is to allow the standard mold to be so shaped at its extreme upper end and without other changes, that it will receive center and support the hot top feeder against lateral movement, whereby a simple, cheap and effective mold and feeder is provided.

In the accompanying drawings:

Fig. 3 is a vertical sectional view of a modified form showing the mold of the form with straight or parallel walls;

Fig. 4 is a vertical sectional view of another modified form showing the mold of the form with the walls converging towards its upper end;

Fig. 5 is a vertical sectional view similar to Fig. 2 showing a feeder of relatively thicker walls adapted to be applied to the mold;

Fig. 6 shows a sectional view similar to Fig. 2 showing our feeder adapted to be applied to a mold of a greater diameter than the feeder;

Figure 1:
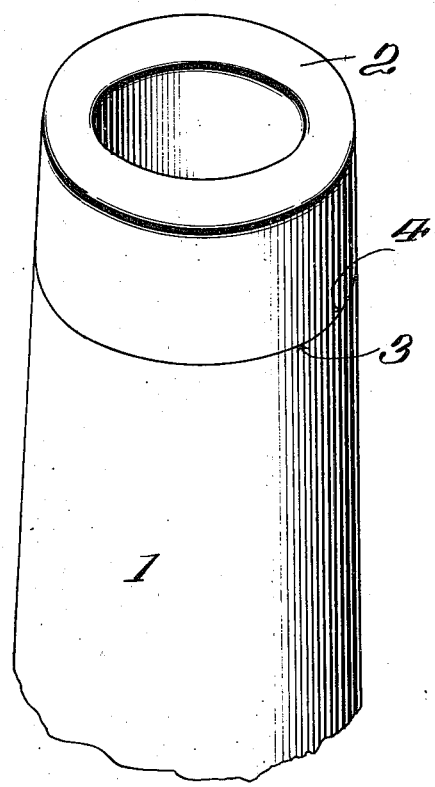
Figure 1 is a perspective view of an ingot mold showing our improved feeder applied thereto.

Referring now to the drawings, 1 represents the ingot mold which is of a circular form in cross section and 2 is the feeder. The upper edge of the mold 1 is beveled inwardly as indicated at 3 and the lower edge of the feeder is beveled outwardly as indicated at 4 and whereby the two bevels correspond and the feeder will tightly fit upon the upper edge of the mold. By this arrangement it will be seen that applicants provide means for holding and causing the feeder to center itself on the upper edge of the mold. By this structure it will be seen that any slight variation in the relative size of the mold and feeder will allow the proper positioning and centering of the feeder on the mold.

In the form shown in Fig. 3 we have shown the upper edge of the mold 5 beveled for only a portion of its thickness as indicated at 6 having a flat horizontal portion 7 adjacent its outer periphery. The feeder has its lower edge beveled corresponding to that of the mold so that feeder will properly center itself on the mold.

In the form shown in Fig. 4 the mold has its upper edge beveled from the inner edge downwardly as indicated at 10 and the lower edge of the feeder is correspondingly beveled so that the feeder will fit molds of various sizes and at the same time center itself thereon.

In the form shown in Fig. 5 we have shown the form of mold in which the walls of the feeder 11 are considerably thicker than that of the mold so that it will center itself on molds, the diameters of which vary greatly.

Figure 2:
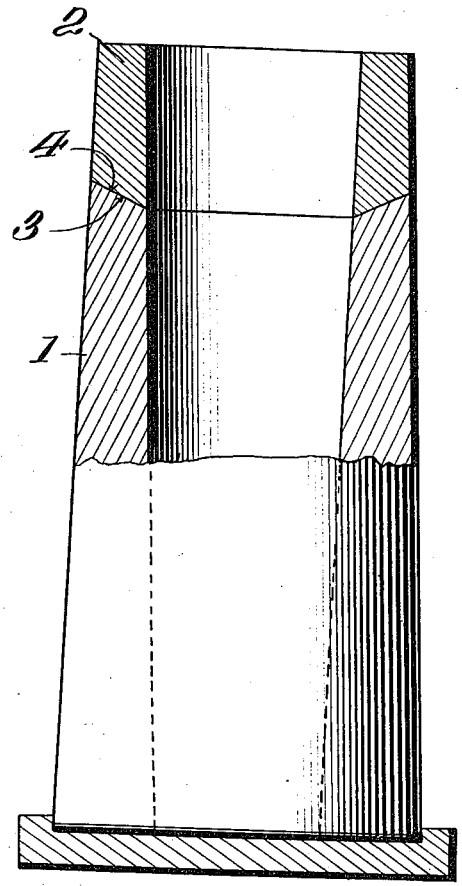
Fig. 2 is a vertical sectional view of Fig. 1 showing the ingot mold of the form tapering outwardly towards the upper end.

Fig. 6 shows the form of feeder shown in Fig. 2 of the drawings, the mold 12 being of a diameter considerably greater than that of the feeder 13.

Figure 7:
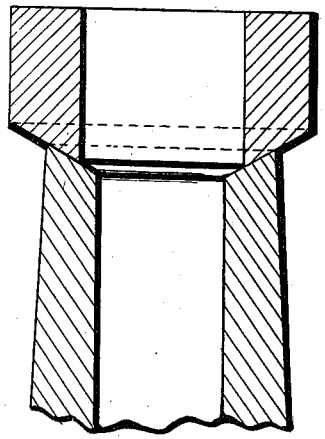
Fig. 7 is a view similar to Fig. 6 showing the application of the feeder of a diameter greater than that of the mold for which it was intended to be used.
Figure 8:
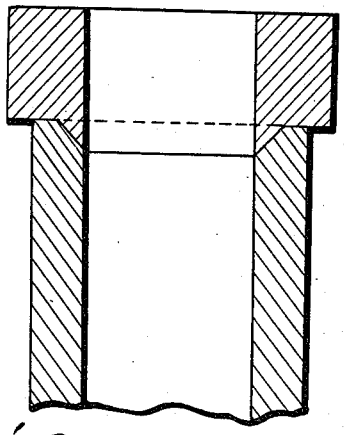
Fig. 8 is a vertical sectional view showing our invention adapted to have walls of a greater thickness than that of the mold.

Figs. 7 and 8 shows a sectional view showing feeders the walls of which are considerably thicker than that of the mold and showing the form of beveled edges corresponding to Figs. 2 and 3.

Figure 9:
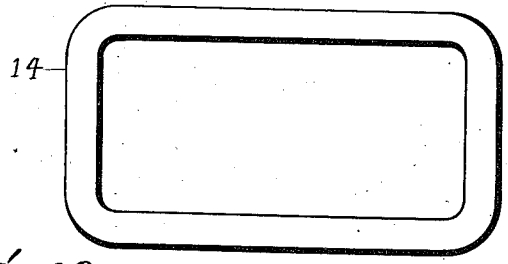
Fig. 9 is a top plan view of a feeder oblong in cross section and embodying our invention.

Fig. 9 is a top plan of an oblong mold 14.

Figure 10:
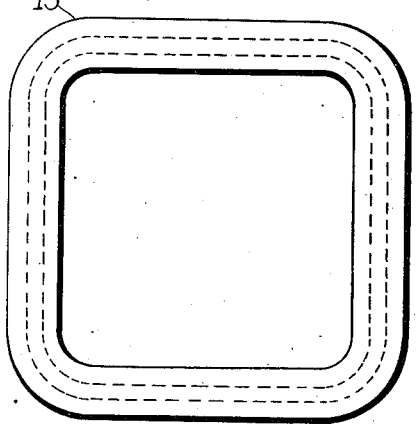
Fig. 10 is a top view of a feeder square in cross section.

Fig. 10 is a top plan view of a square mold 15.

Figure 11:
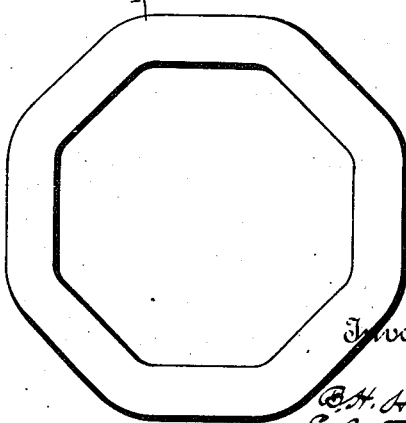
Fig. 11 is a top plan view of a feeder octagon in cross section.

Fig. 11 is a top plan view of an octagon mold 16.

Figure 12:
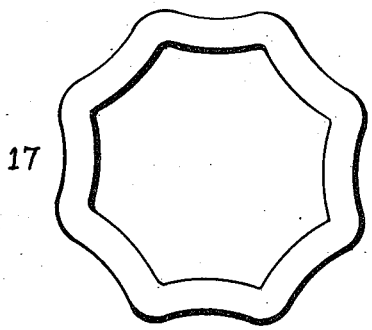
Fig. 12 is a top plan view of a feeder of the fluted wall construction.

Fig. 12 is a top plan view showing a fluted mold 17.

Having thus described our invention, what we claim as new and desire to secure by Letters Patent, is:

1. The combination with an ingot mold having a beveled edge, of a feeder having a corresponding beveled lower edge arranged so that a feeder of considerable less or greater diameter will seat itself on the mold and be retained therein.

2. The combination with an ingot mold having its upper edge beveled, of a feeder having its lower edge beveled and corresponding with the bevel of the mold.

3. The combination with an ingot mold having its upper edge beveled in one direction, of a feeder having its lower edge beveled and corresponding with the bevel of the mold and arranged so that the inner walls of the feeder and mold are flush.

4. An ingot mold comprising a body portion having a beveled upper edge adapted to center and retain a feeder of different diameters.

5. A feeder for ingot molds comprising a body portion of refractory material having a beveled lower edge adapted to center and retain itself on molds of different diameters.

6. The combination with an ingot mold having its upper edges beveled inwardly of a feeder having its lower edge beveled inwardly and corresponding with the bevel of the mold.

7. The combination with an ingot mold having its upper edge beveled, of a feeder having its lower edge beveled inwardly and corresponding with the bevel of the mold and arranged so that the inner walls of the feeder and mold are flush.

8. The combination with an ingot mold having its upper edge beveled, of a feeder having its lower edge beveled and corresponding with the bevel of the mold and arranged so that molds and feeders of relative different sizes can be used and the feeder center itself on the mold and retained thereon by the bevel.

In testimony whereof we affix our signatures.

BLOOMFIELD H. HOWARD.
ERNEST J. TURNER.